United States Patent
Omori et al.

(10) Patent No.: US 11,290,611 B2
(45) Date of Patent: Mar. 29, 2022

(54) DOCUMENT READING APPARATUS AND IMAGE FORMING APPARATUS

(71) Applicant: CANON KABUSHIKI KAISHA, Tokyo (JP)

(72) Inventors: Masaki Omori, Toride (JP); Seiji Nishizawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/853,791

(22) Filed: Apr. 21, 2020

(65) Prior Publication Data
US 2020/0366807 A1   Nov. 19, 2020

(30) Foreign Application Priority Data
May 14, 2019 (JP) .............................. JP2019-091656

(51) Int. Cl.
*H04N 1/04* (2006.01)
*H04N 1/10* (2006.01)
*H04N 1/12* (2006.01)

(52) U.S. Cl.
CPC ................. *H04N 1/10* (2013.01); *H04N 1/12* (2013.01)

(58) Field of Classification Search
CPC ........... H04N 1/00779; H04N 1/00652; H04N 1/00673; H04N 1/00793; H04N 1/10; H04N 1/12
USPC ................................................ 358/498, 496
See application file for complete search history.

(56) References Cited

U.S. PATENT DOCUMENTS

| | | | | |
|---|---|---|---|---|
| 4,634,263 A * | 1/1987 | Miwa | ................. | G03B 27/6264 271/270 |
| 5,599,014 A * | 2/1997 | Kitahara | .................. | B65H 5/00 271/263 |
| 7,072,595 B2 | 7/2006 | Joichi et al. | | |
| 7,511,865 B2 * | 3/2009 | Ogata | .................. | H04N 1/0057 358/400 |
| 10,252,872 B2 | 4/2019 | Nishizawa | | |
| 2003/0118360 A1 | 6/2003 | Joichi et al. | | |
| 2004/0213610 A1* | 10/2004 | Yuasa | .................... | B41J 11/009 399/401 |
| 2007/0171488 A1* | 7/2007 | Chen | .................. | H04N 1/00779 358/498 |

(Continued)

FOREIGN PATENT DOCUMENTS

JP    2003-182882 A    7/2003

*Primary Examiner* — Cheukfan Lee
(74) *Attorney, Agent, or Firm* — Venable LLP

(57) ABSTRACT

A document reading apparatus includes a document supporting portion, a conveyance portion, a driving motor, an image reading unit, and a control portion. The control portion is configured to execute a high speed mode in which the conveyance speed is set to a first conveyance speed and a low speed mode in which the conveyance speed is set to a second conveyance speed slower than the first conveyance speed. When the control portion executes the low speed mode, if the document has a first thickness, the control portion is configured to execute a first low speed mode where a first drive speed is set to the driving motor. If the document has a second thickness thicker than the first thickness, the control portion is configured to execute a second low speed mode where a second drive speed faster than the first drive speed is set to the driving motor.

16 Claims, 5 Drawing Sheets

(56) References Cited

U.S. PATENT DOCUMENTS

2016/0241731 A1* 8/2016 Koyanagi ............ H04N 1/0057
2016/0378042 A1* 12/2016 Tanaka ..................... B65H 7/02
  271/10.03

* cited by examiner

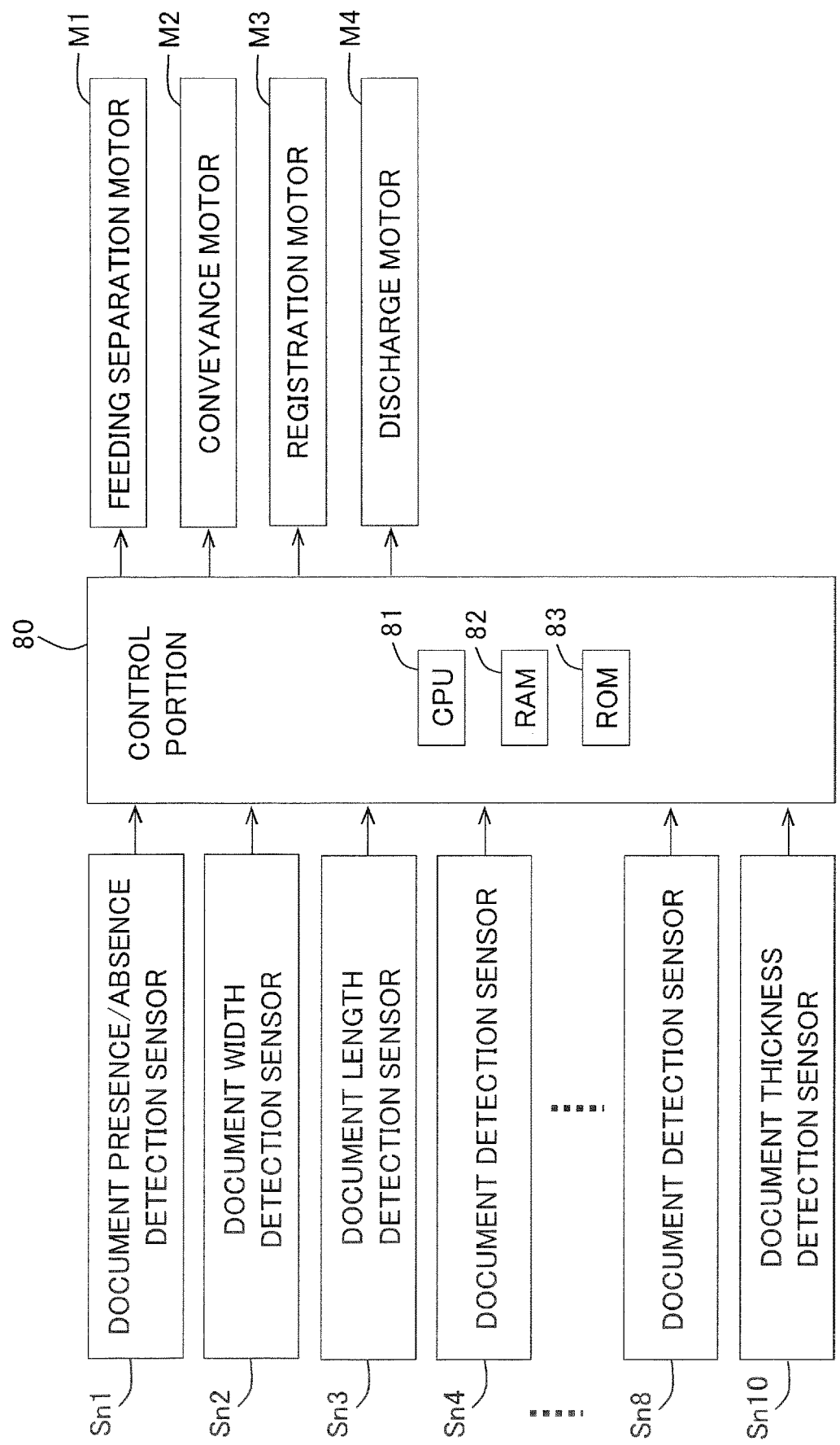

DOCUMENT READING APPARATUS AND IMAGE FORMING APPARATUS

BACKGROUND OF THE INVENTION

Field of the Invention

The present disclosure relates to a document reading apparatus that conveys a sheet, and an image forming apparatus.

Description of the Related Art

For example, a printer, a copier, a facsimile machine, an automatic document feeder (ADF), and the like have mechanisms that convey sheets. When the sheet is conveyed, conveyance resistance (load torque) differs depending on the thickness (grammage) or the size of the sheet. Therefore, setting of a current value supplied to a drive motor that drives a roller for conveying the sheet, depending on information on the sheet (paper sheet information), is disclosed in Japanese Patent Application Laid-Open Publication No. 2003-182882. In Japanese Patent Application Laid-Open Publication No. 2003-182882, the current value of the drive motor is appropriately selected according to the thickness or the size of the sheet, so that a reduction in heat generation and a reduction in power consumption when the sheet is conveyed are achieved.

By the way, in recent years, improvement in productivity is required, and even in a document reading apparatus equipped with the ADF and configured to read an image of a document, reading of an image at a high speed is required. On the other hand, the document reading apparatus is also required to be downsized, and in particular, when the ADF is downsized, it is required to convey the sheet, which is the document, through a conveyance path having a small diameter and a curved shape. However, when a thick sheet such as a cardboard is conveyed through the conveyance path having a small diameter and a curved shape, the conveyance resistance is larger than that of a thin sheet such as a plain paper sheet. When the conveyance resistance increases, the conveyance speed of the document decreases. That is, there is a problem in that when a thick sheet document is read, the read image extends in a sub-scanning direction as compared to the thin sheet.

Accordingly, an object of the present disclosure is to provide a document reading apparatus and an image forming apparatus that can be operated at a high speed, can be downsized, and can ensure quality of the read image.

SUMMARY OF THE INVENTION

According to a first aspect of the present invention, a document reading apparatus includes a document supporting portion configured to support a document, a conveyance portion configured to convey the document supported on the document supporting portion, a driving motor configured to drive the conveyance portion, an image reading unit configured to read an image of the document conveyed by the conveyance portion, and a control portion configured to control a conveyance speed of the conveyance portion by setting a drive speed of the driving motor. The control portion is configured to execute a high speed mode in which the conveyance speed is set to a first conveyance speed and a low speed mode in which the conveyance speed is set to a second conveyance speed slower than the first conveyance speed. In a case where the control portion executes the low speed mode, if the document has a first thickness, the control portion is configured to execute a first low speed mode in which a first drive speed is set to the driving motor. In a case where the control portion executes the low speed mode, if the document has a second thickness thicker than the first thickness, the control portion is configured to execute a second low speed mode in which a second drive speed faster than the first drive speed is set to the driving motor.

According to a second aspect of the present invention, an image forming apparatus includes the document reading apparatus, and an image forming unit configured to form an image of the document read by the image reading unit on a sheet.

Further features of the present invention will become apparent from the following description of exemplary embodiments with reference to the attached drawings.

BRIEF DESCRIPTION OF THE DRAWINGS

FIG. 2 is a block diagram illustrating a control portion according to the first embodiment, and sensors and various motors connected to the control portion.

DESCRIPTION OF THE EMBODIMENTS

First Embodiment

Overall Configuration

Figure 1A:
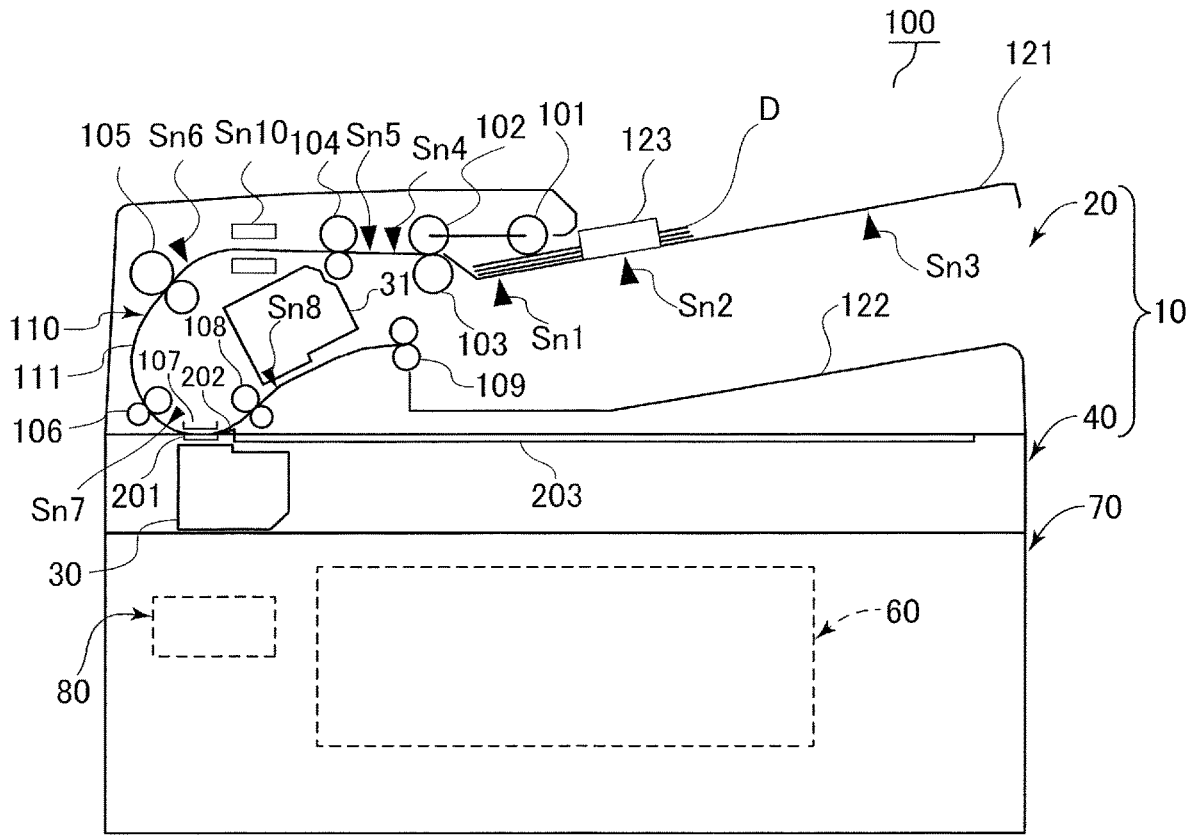
FIG. 1A is an overall schematic diagram illustrating a printer according to a first embodiment.

First, a first embodiment of the present disclosure will be described. A printer 100 as an image forming apparatus according to the first embodiment is a laser beam printer of an electrophotographic system. As illustrated in FIG. 1A, the printer 100 includes a printer body 70 and a document reading apparatus 10 mounted on the printer body 70. Hereinafter, examples of a sheet include, in addition to a plain paper sheet, a special paper sheet such as a cardboard and a coated paper, a recording material having a special shape such as an envelope and an index paper, and a plastic film for an overhead projector, or cloth, and a document is also an example of the sheet.

Figure 1B:
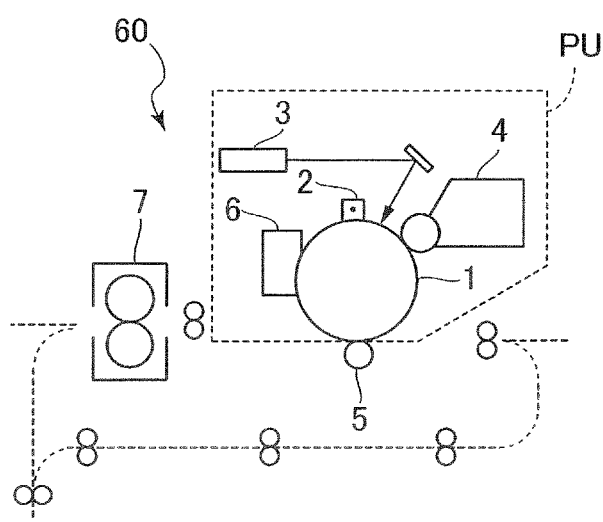
FIG. 1B is a schematic diagram illustrating an image forming engine.

The printer body 70 has an image forming engine 60 as an image forming unit therein. As illustrated in FIG. 1B, the image forming engine 60 includes an image forming unit PU of an electrophotographic system and a fixing unit 7. When an image forming operation is instructed to start, a photosensitive drum 1 which is a photosensitive member rotates, and a drum surface is uniformly charged by a charging unit 2. Then, an exposing unit 3 modulates and outputs a laser beam based on image data transmitted from image reading apparatuses 30 and 31 as an image reading unit or an external computer, and scans the surface of the photosensitive drum 1 to form an electrostatic latent image. This electrostatic latent image becomes a toner image visualized (developed) by toner supplied from a developing unit 4.

A feeding operation of feeding a sheet loaded on a cassette or a manual feed tray that are not illustrated to the image forming engine 60 is executed together with such an image forming operation. The fed sheet is conveyed in accordance with progress of the image forming operation by the image forming unit PU. Then, the toner image supported on the photosensitive drum 1 is transferred to the sheet by a transfer roller 5. The toner remaining on the photosensitive drum 1 after the toner image is transferred is collected by a cleaning unit 6. The sheet onto which an unfixed toner image is transferred is delivered to the fixing unit 7 and is heated and pressed while being nipped by a pair of rollers. The sheet on which the toner is fused and fixed to the sheet to fix the image is discharged by a discharge mechanism such as a discharge roller pair.

Image Reading Apparatus

Next, the document reading apparatus 10 will be described in detail. As illustrated in FIG. 1A, the document reading apparatus 10 includes: an automatic document feeder (ADF) 20 that feeds a document D supported, that is, loaded, on a document tray 121 and discharges the document D to a discharge tray 122; and a reading unit 40 that reads a document conveyed by the ADF 20. That is, the ADF 20 constitutes a sheet conveyance apparatus that conveys the sheet as a document to the reading unit 40. The reading unit 40 constitutes an image reading unit including an image reading apparatus 30 that reads an image on the front surface of the document D. Further, the document tray 121 constitutes a sheet supporting portion and the discharge tray 122 constitutes a discharge supporting portion. The ADF 20 is rotatably supported by the reading unit 40 by a hinge such that a document stand glass 203 can be opened. Further, the document D, which is an example of the sheet, may be blank paper or may have an image on one side or images on both sides thereof.

The ADF 20 includes, as a conveyance portion, a pickup roller 101 as a feed roller, a separation drive roller 102 and a separation driven roller 103 constituting a separation roller pair, and a registration roller pair 104. Further, the ADF 20 has, as a conveyance portion, conveyance roller pairs 105, 106, and 108, and a discharge roller pair 109. Further, the ADF 20 has an image reading apparatus 31. Further, the ADF 20 has a document presence/absence detection sensor Sn1, a document width detection sensor Sn2, and a document length detection sensor Sn3. Further, the ADF 20 has a document detection sensor Sn4, a document detection sensor Sn5, a document detection sensor Sn6, a document detection sensor Sn7, a document detection sensor Sn8, and an ultrasonic sensor Sn10.

Among these sensors, a reflection type or transmission type optical sensor can be used for sensors other than the document width detection sensor Sn2 and the ultrasonic sensor Sn10. Further, an optical sensor, such as a photointerrupter, for detecting the position of a light shielding plate provided in a regulation plate 123 can be used as the document width detection sensor Sn2. The ultrasonic sensor Sn10 will be described below. As illustrated in FIG. 2, signals from these sensors are output to a control portion 80, are determined by the control portion 80, and have the following functions.

Figure 4:
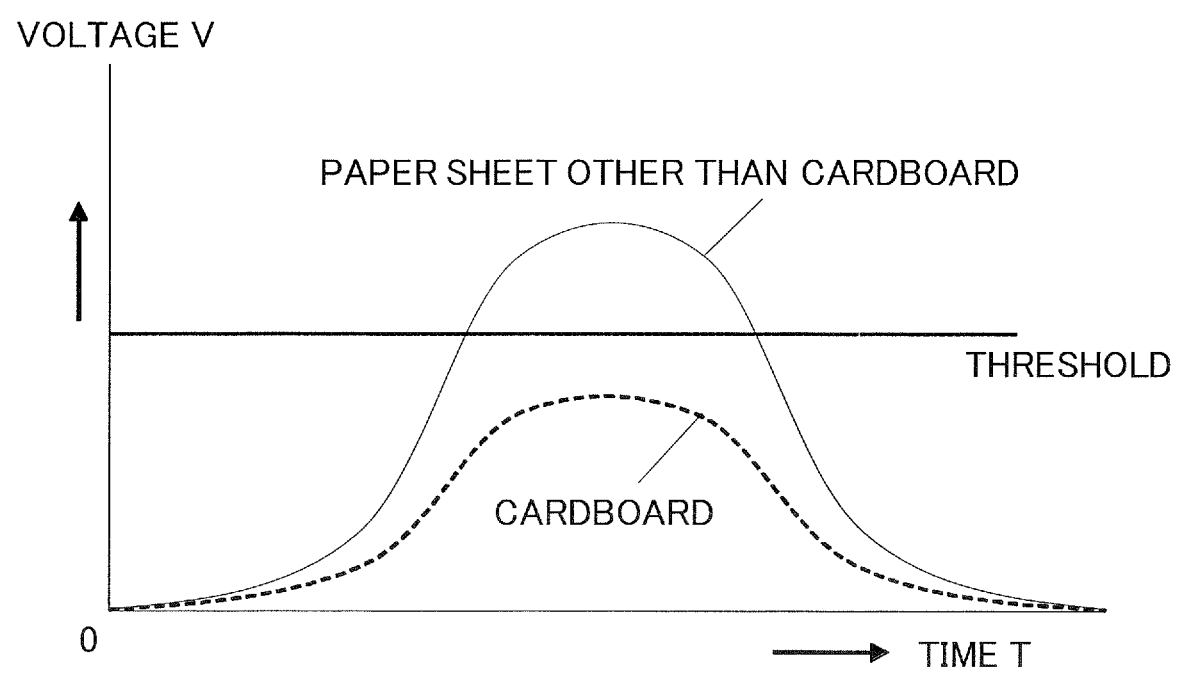
FIG. 4 is a graph illustrating a relationship between a vibration receiving intensity of a vibration receiving element of a document thickness detection sensor and a threshold according to the first embodiment.

The document presence/absence detection sensor Sn1 detects the presence/absence of the document D on the document tray 121. The document width detection sensor Sn2 detects the width of the document D by detecting the position of the regulation plate 123 that regulates the width of the document D on the document tray 121. The document length detection sensor Sn3 detects whether or not the length of the document D on the document tray 121 is equal to or larger than a predetermined length, thereby detecting whether or not the length of the document is equal to or larger than the predetermined length. The document detection sensors Sn4 to Sn8 detect a leading edge and a trailing edge of the document D. The ultrasonic sensor Sn10 as a detection unit oscillates ultrasonic waves from an oscillation element toward the document D, and receives the ultrasonic waves transmitted through the document D by a vibration receiving element. As illustrated in FIG. 4, since the ultrasonic waves received by the vibration receiving element change in accordance with the transmittance of the document D, whether the document D is the cardboard or another sheet can be determined based on whether or not a value obtained by converting the ultrasonic waves into a voltage V exceeds a threshold value.

On the other hand, the reading unit 40 has a platen glass 201, a jump stand 202, the document stand glass 203, and the image reading apparatus 30.

The document reading apparatus 10 reads image information from the document D by a feeding-reading mode of scanning a document image while feeding the document D loaded on the document tray 121 by the ADF 20 and a fixed-reading mode of scanning the document placed on the document stand glass 203. The feeding-reading mode is selected when the document presence/absence detection sensor Sn1 detects the document D loaded on the document tray 121 or when a user explicitly makes an instruction using an operating panel or the like of the printer body 70.

When the feeding-reading mode is executed, the pickup roller 101 is lowered to come into contact with the uppermost document D of the document tray 121. Then, the document D is fed by the pickup roller 101 and is separated one by one in a separation nip as a separating unit formed with the separation drive roller 102 and the separation driven roller 103. A torque limiter is disposed in a rotation support structure of the separation driven roller 103, and the separation driven roller 103 follows the separation drive roller 102 when the number of the fed documents is one, and does not rotate when the number of the fed documents is two or more. Therefore, the document can be separated one by one. A drive in an opposite direction to a sheet feeding direction may be input to the separation driven roller 103.

The leading edge and the trailing edge of the document having passed through the separation nip are detected by the document detection sensor Sn4, and serve as a reference for an elevation timing, a drive starting timing, and a drive stopping timing of the pickup roller 101. Further, the leading edge and the trailing edge of the document D are detected by the document detection sensor Sn5, and serve as a reference for a drive starting timing and a drive stopping timing of the registration roller pair 104. The pickup roller 101 and the separation drive roller 102 are connected to and driven by a feeding separation motor M1 (see FIG. 2) that is the same drive source.

The leading edge of the conveyed document D abuts on the registration roller pair 104 in a stopped state, so that an oblique motion of the document D is corrected. The document D of which the oblique motion is corrected is conveyed by the registration roller pair 104, and is conveyed toward the platen glass 201 and the image reading apparatus 31 by the conveyance roller pairs 105, 106, and 108. A platen guide 107 facing the platen glass 201 is disposed, and the platen guide 107 guides the document D passing through the platen glass 201 such that the document D does not float off the platen glass 201. The conveyance roller pairs 105, 106, and 108 are connected to and driven by a conveyance motor M2 (see FIG. 2), and the registration roller pair 104 is connected to and driven by a registration motor M3 (see FIG. 2).

The leading edge and the trailing edge of the document D having passed through the registration roller pair 104 are detected by the document detection sensor Sn6, and serve as a reference for a drive starting timing and a drive stopping timing of the conveyance roller pairs 105, 106, and 108. Further, the leading edge and the trailing edge of the document D having passed through the conveyance roller pair 106 are detected by the document detection sensor Sn7, and serve as a reference for starting and terminating a reading operation of the image reading apparatus 30. Further, the leading edge and the trailing edge of the document D having passed through the conveyance roller pair 108 are detected by the document detection sensor Sn8, and serve as a reference for starting and terminating the reading operation of the image reading apparatus 31.

The image on the front surface of the document D is read by the image reading apparatus 30 via the platen glass 201 and the image on the back surface of the document D is read by the image reading apparatus 31. Image information photoelectrically converted by light receiving elements of line sensors, which are not illustrated, of the image reading apparatuses 30 and 31 is transferred to the control portion 80 (see FIG. 2). Then, the document D having passed through the platen glass 201 is guided to the conveyance roller pair 108 by the jump stand 202, passes through the image reading apparatus 31, and is discharged to the discharge tray 122 by the discharge roller pair 109. The discharge roller pair 109 is connected to and driven by a discharge motor M4 (see FIG. 2).

On the other hand, the fixed-reading mode is selected when the document D placed on the document stand glass 203 is detected by the apparatus or when a user explicitly makes an instruction using the operating panel or the like of the printer body 70. In this case, the document D on the document stand glass 203 does not move, and the image reading apparatus 30 scans the document D while moving along the document stand glass 203. Similarly, image information photoelectrically converted by the light receiving element of the line sensor, which is not illustrated, of the image reading apparatus 30 is transferred to the control portion 80 (see FIG. 2).

Control Portion

Next, a configuration of the control portion 80 as a control section of the printer 100 and the ADF 20 will be described with reference to FIG. 2. As illustrated in FIG. 2, the control portion 80 has a CPU 81, a RAM 82, a ROM 83 and the like. Further, the control portion 80 is connected to the document presence/absence detection sensor Sn1, the document width detection sensor Sn2, the document length detection sensor Sn3, the document detection sensors Sn4 to Sn8, and the ultrasonic sensor Sn10 as a document thickness detection sensor, which are described above, and receives input of signals from these sensors. Further, the feeding separation motor M1, the conveyance motor M2, the registration motor M3, and the discharge motor M4 as a driving source or a drive motor are connected to the control portion 80, drive speeds thereof are set, and a conveyance speed of the document of each roller pair is set.

Mode Setting Control

Figure 3:
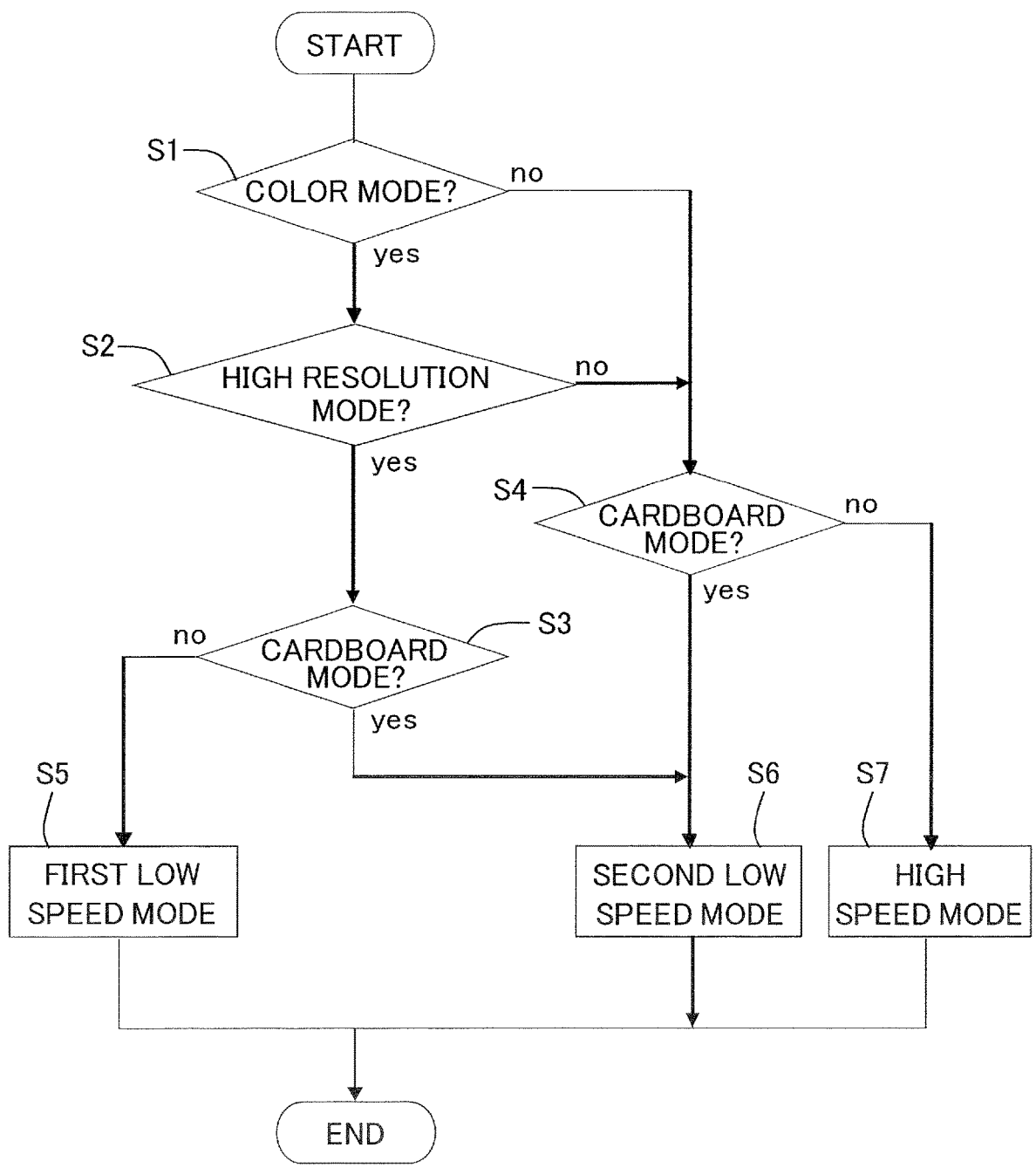
FIG. 3 is a flowchart illustrating mode setting control of a drive speed according to the first embodiment.

Next, a mode setting control for setting drive speeds of the drive motors such as the feeding separation motor M1, the conveyance motor M2, the registration motor M3, and the discharge motor M4, which are described above, will be described using FIG. 3 with reference to FIG. 1A.

In the present embodiment, in order to reduce a space of the ADF 20, the document tray 121 and the discharge tray 122 are arranged to overlap each other in a vertical direction. Therefore, the conveyance path 110 through which the document D is conveyed is formed in a U shape in a form in which the front and back surfaces of the document D are reversed when viewed from the width direction perpendicular to a direction of document conveyance (direction of sheet conveyance), that is, has a curved shape 111. As the diameter of the arc of the curved shape 111 becomes smaller, the ADF 20 is downsized. However, as the stiffness (force of returning to the original shape when the document is bent) of the document D increases, conveyance resistance increases. The stiffness of the document D is substantially proportional to the thickness of the document D. That is, when the document D is the cardboard, the conveyance resistance becomes larger than the other paper types (such as a plain paper sheet). When the document D is the cardboard, the conveyance resistance increases, and the sliding amount of each roller pair increases. Therefore, even when the drive motors are driven at the same speed, the conveyance speed is reduced by about several percent. When the conveyance speed of the document D is reduced, the image read by the image reading apparatuses 30 and 31 extends in the sub-scanning direction to that extent. Therefore, it is considered that an image reading speed by the image reading apparatuses 30 and 31 is reduced in accordance with the conveyance speed. However, since the scanning speed is finely controlled, the control becomes complicated.

On the other hand, when a monochrome image is read or a low resolution image is read in order to improve productivity, it is considered that the document D is conveyed at a high speed. However, when the conveyance speed of the document D increases, the conveyance resistance increases according to the speed, and thus, performance of each drive motors cannot catch up. In particular, in the document D that is the cardboard, due to the curved shape 111, the conveyance speed is reduced, the next document D catches up with the current document D, and thus a jam (sheet jam) may occur.

Therefore, in the present embodiment, in order to make the ADF 20 compact, to achieve a high speed while ensuring quality of the read image, and to improve productivity, the mode setting control, which will be described below, is executed. In the present embodiment, the designed conveyance speed of the document D is two types including a high speed and a slower low speed, and the reading speed of the image reading apparatuses 30 and 31 is also two types including a high speed and a slower low speed, which corresponds to the conveyance speed. Further, as a mode of the reading processing in the present embodiment, a color mode for reading the image of the document D in colors and a monochrome mode for reading the image of the document D in black and white can be executed. Further, as a mode of the reading processing in the present embodiment, a high resolution mode for, for example, 600 dpi or more and a low resolution mode for a resolution less than, for example, 600 dpi can be executed.

When the mode setting control starts, the control portion 80 firstly determines whether or not setting of image reading processing instructed by an operating unit (operating panel), which is not illustrated, of the printer 100 or by the external computer is a color mode (S1). That is, it is determined whether the instructed setting of the image reading processing is a monochrome mode of reading the image of the document D in black and white or a color mode of reading the image in colors, by the image reading apparatuses 30 and 31. When the setting is not the color mode (no in S1), that is, when the monochrome mode is selected, the process proceeds to step S4.

On the other hand, when the setting is the color mode (yes in S1), the resolution in the setting of the image reading processing instructed by the operating unit (operating panel), which is not illustrated, of the printer 100 or the external computer is determined (S2). That is, when the instructed resolution is a low resolution (first resolution) that is less than, for example, 600 dpi (no in S2), the process proceeds to step S4 as a low resolution mode (first resolution mode). On the other hand, when the instructed resolution is a high resolution (second resolution) that is higher than the low resolution, for example, 600 dpi or more (yes in S2), the process proceeds to step S3 as a high resolution mode (second resolution mode).

When the process proceeds to step S3, it is determined whether the document D is the cardboard (having a second thickness) or a paper sheet (having a first thickness) other than the cardboard, on the basis of the detection result of the ultrasonic sensor Sn10. That is, when the document D is a cardboard, it is determined that a paper type mode is a cardboard mode (yes in S3), and when the document D is a paper sheet other than the cardboard, it is determined that the paper type mode is a normal mode (no in S3). When it is determined that the normal mode is selected, the color mode and the high resolution mode are selected. Thus, a current mode is set to a first low speed mode in which the conveyance speed and the reading speed of the document D are low speeds (second conveyance speed) (S5). When the current mode is set to the first low speed mode, the control portion 80 sets a first drive speed as the first low speed mode to the respective drive motors (the feeding separation motor M1, the conveyance motor M2, the registration motor M3, and the discharge motor M4). Accordingly, the respective rollers (the pickup roller 101, the separation drive roller 102, the registration roller pair 104, the conveyance roller pairs 105, 106, and 108, and the discharge roller pair 109) are rotationally driven at the first drive speed that is a low speed, and the conveyance speed of the document D is set to a low speed. Accordingly, when a color image having a high resolution is read, the quality of the read image can be ensured.

Further, when it is determined in step S3 that the cardboard mode is selected, the color mode and the high resolution mode are selected, and thus the current mode is set to a second low speed mode in which the conveyance speed and the reading speed of the document D are slow (S6). When the current mode is set to the second low speed mode, the control portion 80 sets a second drive speed that is faster than the first drive speed as the second low speed mode with respect to the respective drive motors (the feeding separation motor M1, the conveyance motor M2, the registration motor M3, and the discharge motor M4). Thus, the respective rollers (the pickup roller 101, the separation drive roller 102, the registration roller pair 104, the conveyance roller pairs 105, 106, and 108, and the discharge roller pair 109) are rotationally driven at a low speed and at the second drive speed that is faster than the first low speed mode. The second drive speed is a speed obtained by considering the sliding amount of the cardboard in each roller. That is, the conveyance speed of the document D is set to be the same as the conveyance speed in the first low speed mode when, for example, a plain paper sheet or the like is conveyed. Accordingly, even when the document D is the cardboard, the read image can be prevented from being extended, and the quality of the read image can be ensured. In the present embodiment, a case where the control portion 80 sets the second drive speed in the respective drive motors such that the conveyance speed of the document D in the second low speed mode is the same as that of the first low speed mode has been described. However, the present disclosure is not limited thereto, and the second drive speed may be set such that the conveyance speed of the document D in the second low speed mode is different from that of the first low speed mode.

When the process proceeds to step S3 as described above, it is determined that the low speed mode is executed when the color mode and the high resolution mode are performed through steps S1 and S2. When the low speed mode is executed, one of the first low speed mode as the normal mode and the second low speed mode as the cardboard mode is executed according to the thickness of the document D.

On the other hand, when the process proceeds to step S4, similar to step S3, it is determined whether the document D is the cardboard or a paper sheet other than the cardboard on the basis of the detection result of the ultrasonic sensor Sn10. That is, when the document D is the cardboard, it is determined that the cardboard mode is selected (yes in S4), and when the document D is the paper sheet other than the cardboard, it is determined that the normal mode is selected (no in S4). When it is determined that the normal mode is selected, the current mode is set to a high speed mode in which the conveyance speed and the reading speed of the document D are set to a high speed (first conveyance speed) (S7). When the current mode is set to the high speed mode, the control portion 80 sets a high speed drive speed as the high speed mode with respect to the respective drive motors. Accordingly, the respective rollers are rotationally driven at a high speed, and the conveyance speed of the document D is set to a high speed faster than the low speed. Accordingly, when a monochrome image having a low resolution in a plain paper sheet is read, the number of processed sheets per unit time can be increased, and productivity can be improved.

Further, when it is determined in step S4 that the cardboard mode is selected, the monochrome mode or the low resolution mode is selected. However, the process proceeds to step S6 described above, and the current mode is set to the second low speed mode in which the conveyance speed and the reading speed of the document D are set to a low speed. Therefore, the respective rollers are rotationally driven at the low speed and at the second drive speed. Accordingly, when the document D is the cardboard and an image is attempted to be read at a high speed, in particular, the next document D may catch up with the current document D due to the curved shape 111 to cause a jam. However, since the image is read at a low speed, occurrence of such a jam can be prevented. Further, as the respective drive motors are driven at the second drive speed in consideration of the sliding amount of the cardboard, even when the reading speed remains low, the read image can be prevented from being extended, and the quality of the read image can be ensured. That is, in the present embodiment, when a sheet to be read is the cardboard, the low speed mode can be executed regardless of whether the high resolution mode or the low resolution mode is executed. Further, in the present embodiment, when the sheet to be read is the cardboard, the low speed mode can be executed regardless of whether the monochrome mode or the color mode is executed.

Here, in the present embodiment, when it is determined in step S4 that the cardboard mode is selected, the current mode is set to the second low speed mode in which the conveyance speed and the reading speed of the document D are set to a low speed (second conveyance speed). However, the present disclosure is not limited thereto. For example, when it is determined in step S4 that the cardboard mode is selected, the current mode may be set to a third low speed mode in which the conveyance speed is a slower speed than the high speed (the first conveyance speed) in the high speed mode in step S7 or may not be set to the same speed as the low speed (second conveyance speed) in the second low speed mode.

For convenience of description, it has been described that three types of the first drive speed, the second drive speed, and the high speed drive speed are set for the feeding separation motor M1, the conveyance motor M2, the registration motor M3, and the discharge motor M4. However, when the respective drive speeds are set for these drive motors, instead of setting the same drive speed among the three types of drive speeds, different drive speeds are set according to the friction coefficients and the outer diameters of the respective rollers such that the document D has the same conveyance speed. That is, in the case of the cardboard mode, when the second drive speed is set to each of the plurality of drive motors, different drive speeds are set as the second drive speed such that the conveyance speed of the document D by the respective roller is the same.

As described above, in the first embodiment, even when the document D is the cardboard, the conveyance speed can be the same in the case of a paper sheet other than the cardboard, and simplification of various controls can be achieved.

Second Embodiment

Figure 5:
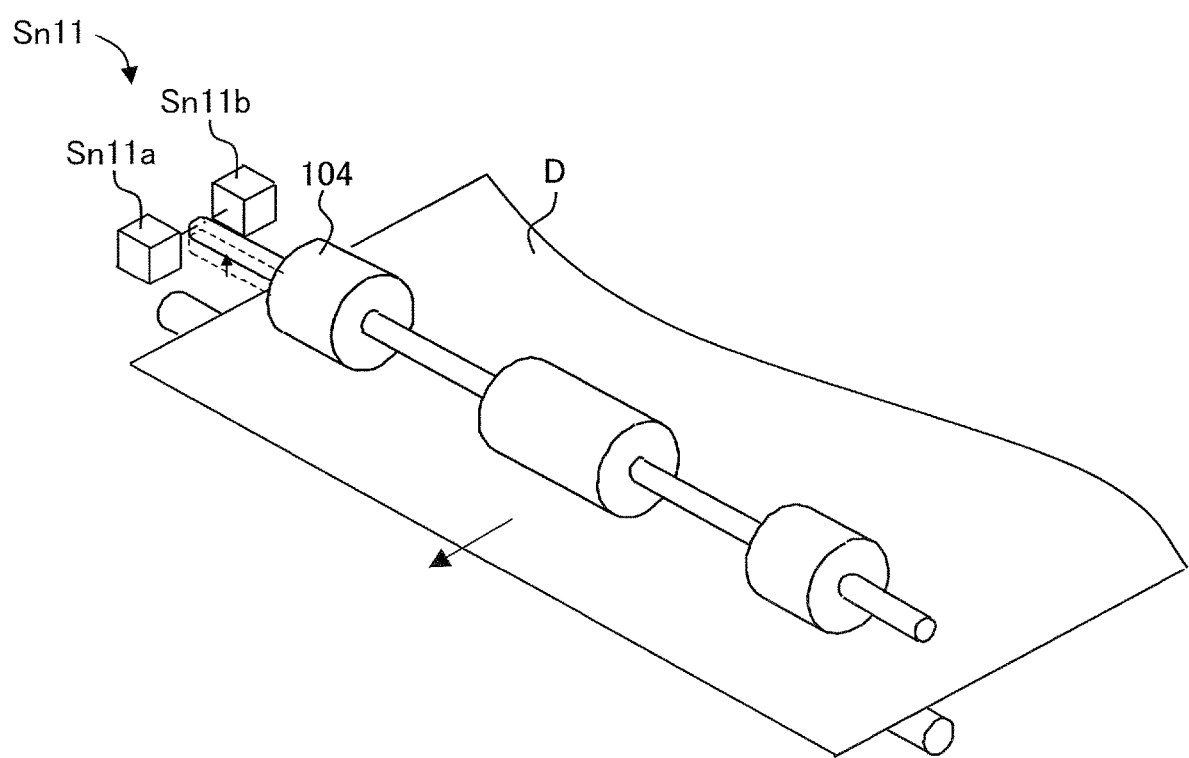
FIG. 5 is a schematic diagram illustrating a structure of the document thickness detection sensor according to a second embodiment.

Next, a second embodiment obtained by partially modifying the first embodiment will be described with reference to FIG. 5. In the first embodiment, it has been described that the ultrasonic sensor Sn10 is disposed downstream of the registration roller pair 104 in the direction of document conveyance to detect the thickness of the document D. In the second embodiment, instead of the ultrasonic sensor Sn10, an optical sensor Sn11 as a detection unit provided adjacent to the registration roller pair 104 in a rotational axis direction detects the thickness of the document D. The optical sensor Sn11 has a light emitting portion Sn11a that has a light source such as an LED and a photosensing portion Sn11b that receives light emitted from the light emitting portion Sn11a. That is, the optical sensor Sn11 has a structure in which when a moving amount of one roller shaft of the registration roller pair 104 is equal to or larger than a predetermined amount, the light received by the photosensing portion Sn11b is shielded, and can detect that the document D is the cardboard when the moving amount is equal to or larger than the predetermined amount. Since the other configurations, the other operations, and the other effects are the same as those of the first embodiment, description thereof will be omitted.

Possibility of the Other Embodiments

In the first and second embodiments described above, it has been described that the high speed mode or the low speed mode is selected based on both whether or not the color mode is selected and whether or not the high resolution mode is selected. However, the high speed mode or the low speed mode may be determined only based on whether or not the color mode is selected, or the high speed mode or the low speed mode may be determined only based on whether or not the high resolution mode is selected. That is, according to the present disclosure, when the reading resolution is low and/or when the document D is read in black and white, an increase in a speed can be achieved, downsizing can be achieved, and even when the document D is the cardboard, the quality of the read image can be ensured.

Further, in the first and second embodiments, it has been described that the thickness of the sheet is determined as two types of the cardboard and a paper sheet other than the cardboard, and accordingly, in the low speed mode, the drive speeds of the drive motors are set to two types. However, the present disclosure is not limited thereto. Three or more types of the thicknesses may be determined, and the drive speeds of the respective drive motors may be set correspondingly.

Further, in the first and second embodiments, it has been described that the color mode or the monochrome mode is set in the image reading processing. However, the present disclosure is not limited thereto. For example, a low color tone, a gray scale, and the like may be treated as the color mode or the monochrome mode. Further, for example, the low color tone and the gray scale are set as an intermediate mode, so that a middle speed mode between the low speed mode and the high speed mode may be set.

Further, in the first and second embodiments, it has been described that the high resolution mode of 600 dpi or more and the low resolution mode of less than 600 dpi are set in the image reading processing. However, the present disclosure is not limited thereto. For example, a middle resolution mode of 400 dpi or the like is set, so that the middle speed mode between the low speed mode and the high speed mode may be set. These resolution numerical values such as 600 dpi are merely examples, and any values may be used.

Further, in the first and second embodiments, it has been described that the ADF 20 includes four motors including the feeding separation motor M1, the conveyance motor M2, the registration motor M3, and the discharge motor M4. However, the present disclosure is not limited thereto. For example, a switching mechanism for transferring a drive force, such as a clutch, is provided, so that the number of motors may be reduced to three or less by using the motors together. Further, conversely, for example, a motor is provided in each of the conveyance rollers, so that the number of motors may be five or more.

Further, it has been described in the first embodiment that the ultrasonic sensor Sn10 detects the thickness of the document D, and in the second embodiment, the optical sensor Sn11 provided adjacent to the registration roller pair 104 in the rotational axis direction detects the thickness of the document D. However, the present disclosure is not limited thereto. The thickness of the document D may be detected (determined) in an appropriate manner. For example, when the type of the sheet is set by the operating panel of the printer body 70 and the external computer, the thickness of the sheet can be detected on the basis of type information.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091656, filed May 14, 2019 which is hereby incorporated by reference herein in its entirety.

What is claimed is:

1. A document reading apparatus comprising:
a document supporting portion configured to support a document;
a conveyance portion configured to convey the document supported on the document supporting portion;
a driving source configured to drive the conveyance portion;
an image reading unit configured to read an image of the document conveyed by the conveyance portion; and
a control portion configured to control a conveyance speed of the document conveyed by the conveyance portion by setting a drive speed of the driving source,
wherein the control portion is configured to execute a high speed mode and a low speed mode in which the conveyance speed is slower than the conveyance speed in the high speed mode,
wherein in a case where the control portion executes the low speed mode, if the document has a first thickness, the control portion is configured to execute a first low speed mode in which a first drive speed is set to the driving source, and
wherein in a case where the control portion executes the low speed mode, if the document has a second thickness thicker than the first thickness, the control portion is configured to execute a second low speed mode in which a second drive speed faster than the first drive speed is set to the driving source.

2. The document reading apparatus according to claim 1, wherein the control portion is configured to selectively execute a first resolution mode in which the image reading unit reads the image of the document at a first resolution and a second resolution mode in which the image reading unit reads the image of the document at a second resolution higher than the first resolution,
wherein in a case where the control portion executes the first resolution mode, if a thickness of the document to be read is the first thickness, the control portion is configured to execute the high speed mode,
wherein in a case where the control portion executes the first resolution mode, if the thickness of the document to be read is the second thickness, the control portion is configured to execute the second low speed mode,
wherein in a case where the control portion executes the second resolution mode, if the thickness of the document to be read is the first thickness, the control portion is configured to execute the first low speed mode, and
wherein in a case where the control portion executes the second resolution mode, if the thickness of the document to be read is the second thickness, the control portion is configured to execute the second low speed mode.

3. The document reading apparatus according to claim 2, wherein the control portion is configured to selectively execute a monochrome mode in which the image reading unit reads the image of the document in black and white and a color mode in which the image reading unit reads the image of the document in colors,
wherein in a case where the control portion executes the monochrome mode, if the thickness of the document to be read is the first thickness, the control portion is configured to execute the high speed mode,
wherein in a case where the control portion executes the monochrome mode, if the thickness of the document to be read is the second thickness, the control portion is configured to execute the second low speed mode,
wherein in a case where the control portion executes the color mode and the first resolution mode, if the thickness of the document to be read is the first thickness, the control portion is configured to execute the high speed mode,
wherein in a case where the control portion executes the color mode and the first resolution mode, if the thickness of the document to be read is the second thickness, the control portion is configured to execute the second low speed mode,
wherein in a case where the control portion executes the color mode and the second resolution mode, if the thickness of the document to be read is the first thickness, the control portion is configured to execute the first low speed mode, and
wherein in a case where the control portion executes the color mode and the second resolution mode, if the thickness of the document to be read is the second thickness, the control portion is configured to execute the second low speed mode.

4. The document reading apparatus according to claim 1, wherein the control portion is configured to set the conveyance speed to a first conveyance speed in the high speed mode and to set the conveyance speed to a second conveyance speed slower than the first conveyance speed in the first low speed mode and the second low speed mode.

5. The document reading apparatus according to claim 1, further comprising:
a discharge supporting portion on which the document of which the image is read by the image reading unit is discharged; and
a conveyance path through which the document is conveyed from the document supporting portion to the discharge supporting portion,
wherein the document supporting portion and the discharge supporting portion are arranged at positions overlapping each other in a vertical direction, and
wherein the conveyance path has a curved shape that is curved when viewed in a direction orthogonal to a direction of document conveyance such that front and back surfaces of the document which is passed through the conveyance path are reversed.

6. The document reading apparatus according to claim 5, further comprising:
a feed roller configured to feed the document supported on the document supporting portion;
a separation roller pair configured to separate the document fed by the feed roller one by one;
a registration roller pair configured to correct an oblique motion of the document conveyed by the separation roller pair; and
a discharge roller pair configured to discharge the document to the discharge supporting portion,
wherein the conveyance portion is a conveyance roller pair configured to convey the document separated by the separation roller pair to the image reading unit,
wherein the driving source comprises one of a plurality of drive motors configured to drive the rollers, and
wherein in a case where the control portion executes the second low speed mode, the control portion is configured to set a different drive speed to at least one of the plurality of drive motors such that the drive speed is set to the second drive speed.

7. The document reading apparatus according to claim 1, further comprising:
a detection unit configured to detect the thickness of the document.

8. The document reading apparatus according to claim 1,
wherein the control portion is configured to selectively execute a monochrome mode in which the image reading unit reads the image of the document in black and white and a color mode in which the image reading unit reads the image of the document in colors,
wherein in a case where the control portion executes the monochrome mode, if a thickness of the document to be read is the first thickness, the control portion is configured to execute the high speed mode,
wherein in a case where the control portion executes the monochrome mode, if the thickness of the document to be read is the second thickness, the control portion is configured to execute the second low speed mode, and
wherein in a case where the control portion executes the color mode, if the thickness of the document to be read is the second thickness, the control portion is configured to execute the second low speed mode.

9. The document reading apparatus according to claim 8, wherein the control portion is configured to set the conveyance speed to a first conveyance speed in the high speed mode and to set the conveyance speed to a second conveyance speed slower than the first conveyance speed in the first low speed mode and the second low speed mode.

10. The document reading apparatus according to claim 8, further comprising:
a discharge supporting portion on which the document of which the image is read by the image reading unit is discharged; and
a conveyance path through which the document is conveyed from the document supporting portion to the discharge supporting portion,
wherein the document supporting portion and the discharge supporting portion are arranged at positions overlapping each other in a vertical direction, and
wherein the conveyance path has a curved shape that is curved when viewed in a direction orthogonal to a direction of document conveyance such that front and back surfaces of the document which is passed through the conveyance path are reversed.

11. The document reading apparatus according to claim 10,
a feed roller configured to feed the document supported on the document supporting portion;
a separation roller pair configured to separate the document fed by the feed roller one by one;
a registration roller pair configured to correct an oblique motion of the document conveyed by the separation roller pair; and
a discharge roller pair configured to discharge the document to the discharge supporting portion,
wherein the conveyance portion is a conveyance roller pair configured to convey the document separated by the separation roller pair to the image reading unit,
wherein the driving source comprises one of a plurality of drive motors configured to drive the rollers, and
wherein in a case where the control portion executes the second low speed mode, the control portion is configured to set different drive speed to at least one of the plurality of drive motors such that the drive speed is set to the second drive speed.

12. The document reading apparatus according to claim 8, further comprising:
a detection unit configured to detect the thickness of the document.

13. An image forming apparatus comprising:
the document reading apparatus according to claim 1; and
an image forming unit configured to form an image of the document read by the image reading unit on a sheet.

14. A document reading apparatus comprising:
a document supporting portion configured to support a document;
a conveyance portion configured to convey the document supported on the document supporting portion;
a driving source configured to drive the conveyance portion;
an image reading unit configured to read an image of the document conveyed by the conveyance portion; and
a control portion configured to control a conveyance speed of the document conveyed by the conveyance portion by setting a drive speed of the driving source,
wherein if the document has a first thickness, the control portion is configured to execute a first mode in which a first drive speed is set to the driving source,
wherein if the document has a second thickness thicker than the first thickness, the control portion is configured to execute a second mode in which a second drive speed faster than the first drive speed is set to the driving source, and
wherein the conveyance speed in the second mode is the same as the conveyance speed in the first mode.

15. A document reading apparatus comprising:
a document supporting portion configured to support a document;
a conveyance portion configured to convey the document supported on the document supporting portion;
a driving source configured to drive the conveyance portion;
an image reading unit configured to read an image of the document conveyed by the conveyance portion; and
a control portion configured to control a conveyance speed of the document conveyed by the conveyance portion by setting a drive speed of the driving source,
wherein the control portion is configured to execute a high speed mode and a low speed mode in which the conveyance speed is slower than the conveyance speed in the high speed mode,
wherein the control portion is configured to selectively execute a first resolution mode in which the image reading unit reads the image of the document at a first resolution and a second resolution mode in which the image reading unit reads the image of the document at a second resolution higher than the first resolution,
wherein in a case where the control portion executes the first resolution mode, if a thickness of the document to be read is the first thickness, the control portion is configured to execute the high speed mode,
wherein in a case where the control portion executes the first resolution mode, if the thickness of the document to be read is the second thickness, the control portion is configured to execute the low speed mode, and
wherein in a case where the control portion executes the second resolution mode, the control portion is configured to execute the low speed mode, regardless of the thickness of the document to be read.

16. A document reading apparatus comprising:
a document supporting portion configured to support a document;
a conveyance portion configured to convey the document supported on the document supporting portion;
a driving source configured to drive the conveyance portion;

an image reading unit configured to read an image of the document conveyed by the conveyance portion; and a control portion configured to control a conveyance speed of the document conveyed by the conveyance portion by setting a drive speed of the driving source, wherein the control portion is configured to execute a high speed mode and a low speed mode in which the conveyance speed is slower than the conveyance speed in the high speed mode, wherein the control portion is configured to selectively execute a monochrome mode in which the image reading unit reads the image of the document in black and white and a color mode in which the image reading unit reads the image of the document in color, wherein in a case where the control portion executes the monochrome mode, if a thickness of the document to be read is the first thickness, the control portion is configured to execute the high speed mode, wherein in a case where the control portion executes the monochrome mode, if the thickness of the document to be read is the second thickness, the control portion is configured to execute the low speed mode, and wherein in a case where the control portion executes the color mode, the control portion is configured to execute the low speed mode, regardless of the thickness of the document to be read.

* * * * *